（12） United States Patent
Salvini (10) Patent No.: US 9,994,264 B2
(45) Date of Patent: Jun. 12, 2018

(54) VEHICLE CAB ASSEMBLY

(71) Applicant: CNH Industrial America LLC, New Holland, PA (US)

(72) Inventor: Tiziano Salvini, Tribiano (IT)

(73) Assignee: CNH Industrial America LLC, New Holland, PA (US)

( * ) Notice: Subject to any disclaimer, the term of this patent is extended or adjusted under 35 U.S.C. 154(b) by 46 days.

(21) Appl. No.: 14/896,001

(22) PCT Filed: Jun. 3, 2014

(86) PCT No.: PCT/EP2014/061490
§ 371 (c)(1),
(2) Date: Dec. 4, 2015

(87) PCT Pub. No.: WO2014/195316
PCT Pub. Date: Dec. 11, 2014

(65) Prior Publication Data
US 2016/0114838 A1    Apr. 28, 2016

(30) Foreign Application Priority Data

Jun. 4, 2013    (IT) .............................. MO2013A0161

(51) Int. Cl.
| | |
|---|---|
| *B62D 33/06* | (2006.01) |
| *B60J 10/00* | (2016.01) |
| *B60R 21/11* | (2006.01) |
| *B60R 21/13* | (2006.01) |
| *B62D 27/02* | (2006.01) |

(52) U.S. Cl.
CPC .......... *B62D 33/0617* (2013.01); *B60J 10/00* (2013.01); *B60J 10/0071* (2013.01); *B60R 21/11* (2013.01); *B60R 21/131* (2013.01); *B62D 27/023* (2013.01)

(58) Field of Classification Search
CPC ........................... B62D 33/0617; B62D 33/06
USPC ............................ 296/190.08, 190.1, 190.11
See application file for complete search history.

(56) References Cited

U.S. PATENT DOCUMENTS

| | | | |
|---|---|---|---|
| 4,433,868 | A | 2/1984 | Hochwitz et al. |
| 4,605,259 | A | 8/1986 | Hurlburt |
| 2002/0153748 | A1 | 10/2002 | Sakyo et al. |
| 2004/0104060 | A1 | 6/2004 | Mori et al. |
| 2011/0121609 | A1 | 5/2011 | Höefle et al. |

FOREIGN PATENT DOCUMENTS

| | | |
|---|---|---|
| EP | 0921055 | 6/1999 |
| EP | 1176084 | 1/2002 |
| FR | 2362041 | 3/1978 |

OTHER PUBLICATIONS

PCT International Search Report and Written Opinion for International Application No. PCT/EP2014/061490 dated Oct. 9, 2014.

*Primary Examiner* — Joseph D. Pape
(74) *Attorney, Agent, or Firm* — Rickard K. DeMille; Rebecca L. Henkel (57) ABSTRACT

A vehicle cab assembly includes an internal frame including multiple rigid members that are secured rigidly one to another. The vehicle cab assembly also includes multiple cladding panels that obscure the internal frame and enclose it uninterruptedly in at least one plane. The cladding panels are supported on an exterior of the internal frame and define mutually abutting panel edges along which the cladding panels are sealed one to another to define weather-proof joints of the vehicle cab assembly.

17 Claims, 4 Drawing Sheets

VEHICLE CAB ASSEMBLY

CROSS REFERENCE TO RELATED APPLICATIONS

This application is a national stage of PCT Application No. PCT/EP2014/061490, entitled "A VEHICLE CAB ASSEMBLY", filed on Jun. 3, 2014, which claims priority from and the benefit of Italian Patent Application Serial No. MO2013A000161, filed on Jun. 4, 2013. Each of the foregoing applications is hereby incorporated by reference in its entirety.

The invention relates to a vehicle cab assembly. The invention also relates to a method of manufacturing such an assembly; and a vehicle including a cab assembly as defined herein.

Many designs of vehicle include a cab, which as is well known is a hollow compartment providing protection for an operator of the vehicle primarily against adverse weather phenomena and also in many cases accident protection as well. The cab typically provides a mounting for a seat for the operator together with mountings for various hand and foot controls of the vehicle.

A typical cab is essentially an enclosed structure defining a hollow interior. The cab usually has one or more openable doors permitting operator access into and out of the cab, and transparent windows that often also are openable.

Examples of vehicles that have cabs include but are not limited to agricultural vehicles such as tractors, loaders, harvesters, crop sprayers and forward control/forward cab multipurpose farm vehicles. Other types of vehicle that have similar cabs include backhoe loaders, bulldozers, cranes and other construction industry vehicles plus specialised vehicles such as snowmobiles, piste grooming machines and forestry tractors.

The invention is applicable in all such types of vehicle and is of particular utility in an agricultural tractor having two large diameter rear driven wheels and smaller front steerable wheels mounted on a vehicle frame.

In such a tractor the operator's cab normally is positioned between the rear wheels which latter extend part-way up the sides of the cab. As a result the operator of an agricultural tractor is positioned relatively high above the ground with good visibility all around the cab via front, rear and side transparent windows. The cab provides protection for the operator against impacts with e.g. branches and other objects that protrude towards the tractor above the tops of the rear wheels and the wheels themselves provide some protection against side impacts.

In a modern agricultural tractor the cab is made as a unit by firstly fabricating a metal frame which defines the edges of a box-like space. The elements making up the frame are metal (e.g. steel) tubes that are welded together at their ends.

Once the frame is constructed a series of panels is secured to the frame to close the spaces defined by the tubes and thereby create the enclosed space that is the interior of the cab.

The panels are formed including apertures for doors of the cab. The doors are secured to the frame using hinges and thereby are made openable and closeable in their apertures.

The panels also include voids that are intended to receive transparent window panels that may be made of glass or (commonly nowadays) a transparent polymeric material.

Following construction of the basic parts of the cab as described the components of the interior such as the seat and control consoles may be secured inside the enclosed space. These interior parts may be added at various times in the construction of the cab, depending on the design of tractor under consideration.

Typically the cab is made as an independent unit that is bolted to the tractor frame during assembling of the parts of the tractor.

The existing method of making a tractor cab as described is associated with numerous disadvantages.

Of these probably the most significant is that the elements of the frame are used as datum edges for mounting of the panels. This means firstly that the edges of the panels are sealed to the frame elements once the panels are mounted on the frame. In other words the frame serves both a locating function for the panels and a mass supporting function.

The manufacturing tolerances inherent in the frame construction however mean that there is significant variability in the positions of the edges of the tubes along which sealing of the panels takes place. Also the profiles of the tubes often are circular, which means that the surface available for sealing purposes is small. These factors mean that the sealing effect is inconsistent and unreliable, with the result that the panels may let in water at locations around the cab. In an agricultural tractor, that is intended to operate in all weather conditions, this is a particular disadvantage.

Moreover the process of assembling the cab according to the prior art method is inefficient partly because of the described inaccuracies in the positions of the datum edges of the frame elements. A fitter seeking to assemble such a cab may spend a considerable amount of time seeking to seal the panel edges. Even if the fitter is successful in sealing the panels the result is unattractive because the gaps between the panels vary from place to place around the cab, the provision of even panel gaps being a particularly desirable objective in automotive design.

The use of the tubes of the frame in the manner described moreover means that at least some parts of the tubes remain exposed on the exterior of the cab. This in turn means firstly that the tubes of the frame, which typically are made from automotive grade steels that are prone to rusting, must be ground in the vicinity of the welds holding them together in order to remove unsightly weld material. Furthermore the tubes by reason of being visible not only must be proofed against oxidation e.g. using an electrophoresis coating process but also must be painted with a finish that matches the finish of the panels. These are all time-consuming, expensive steps.

As a result of the requirement for at least part of the frame to be visible and in effect to be part of the exterior of the cab the freedom of a vehicle designer to vary the appearance of the cab is limited because certain lines and shapes of the panel edges must conform to the shapes of the frame elements.

Yet a further drawback of existing cab designs is that the need to provide datum points of the attachment of panels means that some of the frame elements are tubes having customised cross-sections in order to present surfaces to which the panels may be sealed. These types of tube are expensive to manufacture.

Several proposals have been made in the prior art for connecting panels to vehicle cab frames. In US 20110121609 A1 a metal cab frame is augmented by connectors and attachment points that are adjustable in orientation relative to the connectors. This arrangement however only partially solves the problem of variability of the base frame construction since it primarily seeks to present the panels in an attractive manner in which the panel gaps are consistent.

AU 2512877 A is another example of a cab design in which panels are secured to a base frame.

According to the invention in a first aspect there is provided a vehicle cab assembly comprising an internal frame including a plurality of rigid members that are secured rigidly one to another; and a plurality of cladding panels that obscure the frame and enclose it uninterruptedly in at least one plane, the cladding panels being supported on the exterior of the frame and defining a plurality of mutually abutting panel edges along which the cladding panels are sealed one to another to define a plurality of weather-proof joints of the cab.

Such an arrangement exhibits numerous advantages over the prior art.

The first of these is that by defining mutually abutting panel edges along which the panels are sealed one to another the function of sealing of the cab is removed entirely from the metal cab frame, which latter therefore has chiefly to support the mass of the panels without any requirement additionally to provide a sealing edge that must be accurately located.

This means that the problems of poor sealing of the prior art are eliminated. Furthermore since the frame members do not have to present sealing surfaces it does not matter whether their external surfaces are suitable for acting as sealing surfaces. This in turn means that the frame members may be tubes the cross-sections of which are suited to their functions as strengthening and rigidifying elements in the cab construction. Therefore more of the frame members, and in some cases all the frame members, may be made from the same tube cross-section without compromising the weatherproofing of the cab.

Secondly the feature of the cladding panels obscuring the frame and enclosing it uninterruptedly in at least one plane means that the frame is (a) obscured from view and (b) protected by the cladding panels against damage either from impacts or from the weather.

In practice except at locations that include voids in order to accommodate glazing panels the cladding panels would enclose the frame uninterruptedly essentially from at least the top to the bottom and front to back of the frame, with the result that most if not all the frame is obscured and protected. "Uninterruptedly" as used herein therefore is intended to include an arrangement of panels that but for the presence of the voids would be continuous about the frame, and that following the installation of one or more glazing panels in the voids indeed with the glazing panels define an uninterrupted panel arrangement.

Regardless of the exact manner in which the panels are uninterrupted in at least the aforesaid plane this feature of the invention means that in any such uninterrupted plane the frame members are not visible or exposed on the exterior of the cab.

A further advantage of the assembly of the invention is that the appearances of the cladding panels do not have to match those of the rigid members in any way. This means that a vehicle designer has more freedom than in the case of prior art cab assemblies to vary the panel designs.

Thus a common frame may be employed in a variety of cabs intended to appear externally different from one another, thereby further reducing the cost of vehicle production.

The assembly also reduces the number of components necessary to be welded together by 20-40% as compared to the cabs currently being produced.

Furthermore preferably at least a majority of the rigid members are metal tubular members each of the same cross-section. This feature, which derives from the fact that the rigid members of the frame do not in the assembly of the invention have to provide sealing surfaces for the panels, significantly reduces the cost of the frame compared with prior art arrangements.

As a result of the concealed nature of the rigid members preferably they are welded one to another, are unpainted and are electrophoretically, especially cataphoretically, coated. This advantageously provides for an adequate amount of protection for the frame elements against weathering while minimising the cost of the cab assembly. In other words the frame members do not require grinding, painting or other aesthetic treatment, and instead need weather protection only.

Another advantage of the assembly is that it creates good conditions for sealing of the panels because of a continuous cladding path formed without any interruption. This applies especially to the side panels and the rear panels.

Currently cabs have the sealing gaskets mounted on the glass panels. The gaskets are hence exposed to the impact of the branches when the tractors work close to trees. This not only damages the gaskets but is also not aesthetically pleasing. With the passing of time, the adhesive force of the gaskets on the glass decreases and detachment may occur. In the assembly of the invention, the gaskets are mounted on the panels and hence are hidden and protected from weather conditions. These panels form a fitting perimeter and provide an aesthetic improvement over the prior art. These effects may be further enhanced, within the scope of the invention, through screen printing or frit-type bonding of a dark (e.g. black) perimeter onto any glass or transparent polymer panesl forming part of the assembly. This provides an aesthetically consistent appearance to the panels, and assists to shield any bonding adhesive or sealing compound against degradation cause by exposure to ultraviolet light.

In preferred embodiments of the invention the cladding panels are each secured to the internal frame using one or more fixing members. Typically the fixing members would be screws that pass through the cladding panels into screw holes in the rigid members. Alternative fixing members that may be employed however include nut and bolt combinations and various types of detent fastening that are in themselves known for the fixing of panels. All such arrangements permit the rapid, accurate fixing of the cladding panels to the frame.

Preferably the mutually abutting panel edges are bonded one to another by sealing medium especially extruded glue or bi-adhesive tape.

By "bi-adhesive tape" is meant a flexible tape that is adhesive on both sides. Such a tape may be dispensed from a reel or dispenser during manufacture of the cab assembly in order quickly and firmly to seal the abutting edges of the cladding panels.

The use of such a tape is permitted in part because the abutting edges of the cladding panels do not have to perform any significant weight supporting function. However other forms of sealing material can be used in the alternative if desired. Such sealing compounds may include for example liquid sealants that can be dispensed using a dispenser such as a caulking gun and allowed to cure following dispensing between the abutting edges of the cladding panels.

Conveniently the cladding panels define at least four upstanding side walls of the cab, a roof panel and a bottom panel. This leads to the construction of the cab as an essentially cuboidal enclosure, as is conventional in the tractor cab art. However other cab shapes are possible within the scope of the invention, and the invention is not limited to the combination of cladding panels described herein as being a preferred arrangement. In some embodiments of the invention fewer cladding panels than those listed could be employed. This may be of particular benefit when the vehicle to which the cab assembly is to be fitted includes a deck or other flat member that may serve the purpose of the bottom member described herein. In such a case the bottom member may be omitted from the cab assembly.

Similarly non-cuboidal enclosure shapes may result in more or fewer sidewalls than those specified.

Conveniently, in line with the principle described hereinabove, at least the four side walls are secured one to another so as to enclose the frame uninterruptedly in the region between the uppermost and lowermost parts of the four side walls. As a result the rigid members are obscured from view at all levels between the top and bottom of the cab assembly that might be open to human view when the assembly is intended for use in e.g. an agricultural tractor. This significantly enhances the aesthetics of such a vehicle and as noted improves the freedom of the vehicle designer to vary the appearance of the vehicle from one model to the next.

Preferably the four upstanding side walls include a front wall, a rear wall opposite the front wall and respective side walls disposed on opposite sides of the cab interconnecting the front and rear walls.

This configuration of the side walls is particularly appropriate when the cab assembly is intended to form part of an agricultural tractor, or any of a range of other vehicles such as those listed herein.

Further preferably and as outlined hereinabove one or more of the cladding panels includes formed therein an aperture that is closed by a transparent glazing panel that is secured at the edges of the aperture to the respective cladding panel.

The cladding panel and the glazing panel may be made to similar tolerances such that the glazing panel is an accurate fit in the aperture. As a result the manufacture of the cab assembly may be made quick and economical, and the sealing of the glazing panel in the aperture is more effective than in prior art vehicle cabs.

The or each said glazing panel preferably is secured to the associated said cladding panel by a sealing adhesive compound. Other means of sealing the glazing panel(s) are also possible, and include sealing gaskets the nature of which will be known to the person of skill in the art.

In preferred embodiments of the invention one or more of the cladding panels includes formed therein an openable aperture; and the cab assembly includes a door panel that is moveably securable in the openable aperture such as to permit its conversion between closed and open configurations. This provides for the per se known function, in tractor and other vehicle cab walls, of providing for entry and exit by a vehicle operator.

In an enhancement of this aspect of the invention preferably the cab assembly includes one or more hinges moveably supporting the or each said door panel relative to the associated said openable aperture. The or each said hinge conveniently extends via an aperture in the associated said cladding panel and is secured to the frame.

Thus the frame serves to support the mass of any doors included in the cab assembly, still without providing any sealing surfaces as in prior art arrangements.

Preferably the side walls each have formed therein a wheelarch. Thus the side walls may be manufactured as single-piece items that contain all the main features of a tractor cab side. This is in contrast with many prior art tractor designs, in which the side walls effectively have to be fabricated from separate door and wheelarch sections.

A cab assembly according to the invention that also includes a bottom member as defined herein preferably also includes inside the frame a floor member extending generally parallel to and above the bottom member so as to define a void between the bottom and floor members.

Such an arrangement advantageously permits the inclusion of one or more vehicle sub-systems in the void. Any such sub-system may be installed in the cab assembly before the latter is secured in a vehicle and indeed may be tested for correct operation before installation of the cab assembly occurs.

In one particularly preferred but non-limiting embodiment of the invention the subsystem is an air conditioning system the operative parts and ducting of which may be conveniently located in the void during manufacture of the cab assembly. As noted the air conditioning system may be tested before the cab assembly is installed in a tractor. The floor member may include an openable hatch or may be made removable to facilitate maintenance work on the air conditioning system once the vehicle is in service.

Preferably the or each cladding panel is made from or includes a sheet-moulded composite (SMC) material. Such materials may be moulded with high precision such that the accuracy of the positioning of the mutually abutting sealing edges as defined herein may be assured. SMC materials also permit the integral moulding of features such as the wheelarch referred to herein as part of each side wall; and also various features such as attachment projections and recesses permitting the finishing of the cab assembly through the addition of trim panels, fenders and interior parts such as control consoles. SMC materials also exhibit low thermal expansion, which is important because of the rigid fixing to the frame.

In a second broad aspect of the invention there is provided a method of assembling a vehicle cab assembly according to the invention as defined herein comprising the steps of forming the internal metal frame; securing the cladding panels to it using respective fixings interconnecting the cladding panels and the internal metal frame; and sealing using a sealing bi-adhesive tape the resulting mutually abutting panel edges.

Such a method as noted is economical, quick, reliable and accurate.

The method of the invention also preferably further includes securing at least one transparent glazing panel in an aperture formed in a said cladding panel using a sealing adhesive compound to bond the edges of the glazing panel to the edges of the aperture.

A further, optional aspect of the method of the invention includes using one or more hinges extending respectively through an aperture formed in a said cladding panel to secure at least one moveable door panel to the internal frame so as to be moveable between closed and open configurations of an aperture formed in the cladding panel.

The foregoing steps result in highly efficient production of a cab assembly.

The invention is also considered to reside in a vehicle, especially but not necessarily an agricultural tractor, including a cab assembly as defined herein or manufactured according to a method as defined herein.

In such a vehicle preferably the frame of the cab assembly is a roll-over protection structure (ROPS) and/or a falling object protection structure (FOPS) for the interior of the cab, and is designed and constructed accordingly.

There now follows a description of a preferred embodiment of the invention, with reference being made to the accompanying drawings in which.

Figure 1:
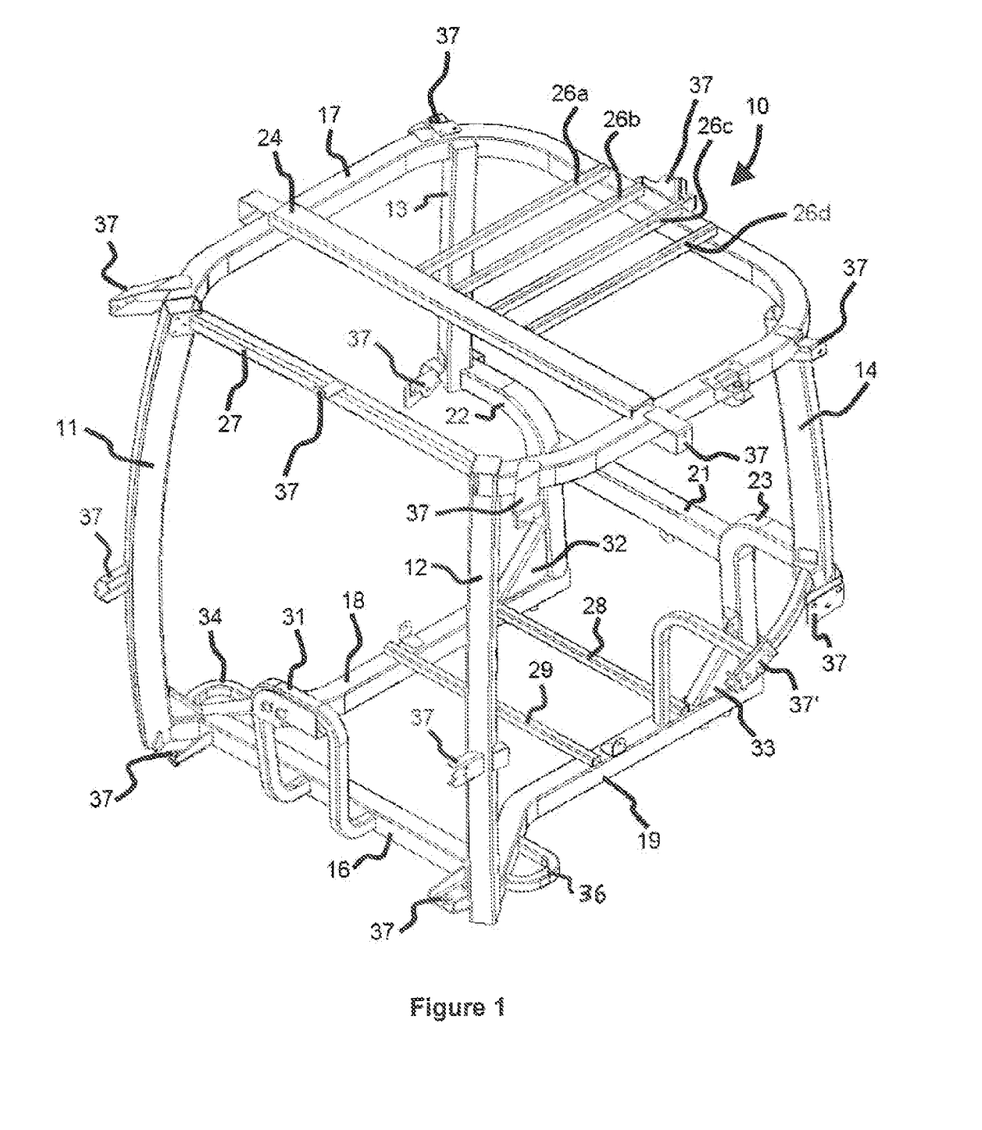
FIG. 1 is a perspective view of an internal frame of a vehicle cab assembly according to the invention.
Figure 3:
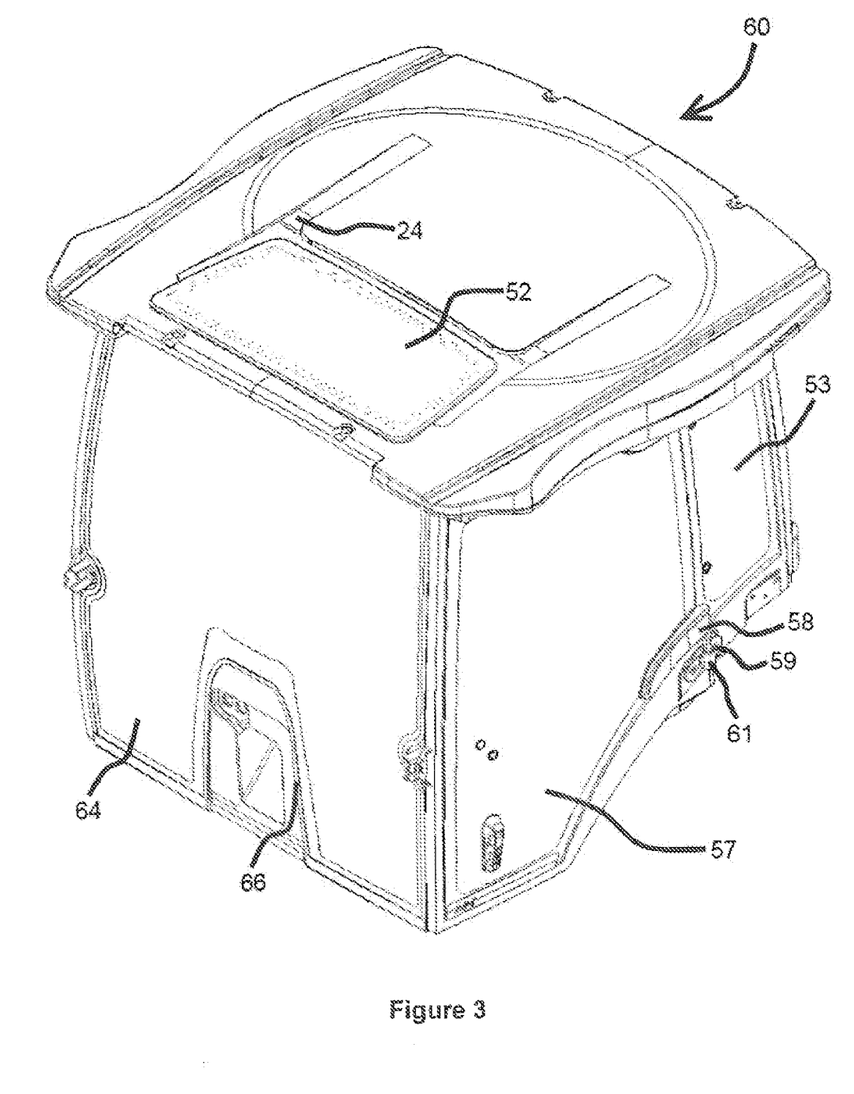
FIG. 3 shows in perspective view the completed cab assembly.

Referring to the drawings there is shown in FIG. 1 an internal frame 10 of a cab assembly 60 that is shown in an assembled form in FIG. 3.

Internal frame 10 consists of a series of rigid members that are secured one to another at their ends.

The rigid members in the illustrated embodiment of the invention are formed as square or rectangular section metal (e.g. automotive steel grade) tubes that are welded together, although other methods of rigidly securing the rigid members one to another may be adopted if required. Furthermore while steels are preferred materials from which to form the rigid members they can be formed from other materials, including some non-metals, as will occur to the worker of skill in the art.

The rigid members 11, 12, 13, 14, 16, 17, 18, 19, 21, 22 and 23 while of differing shapes are all formed with essentially the same cross section that may be a standard profile in the sense of being readily available in the vehicle manufacturing industry.

The functions of these rigid members are described below. The fact that most of the rigid members making up the internal frame 10 have the same profile means that significant economies can be made in the construction of a cab assembly 60 in accordance with the invention compared with the prior art. As further explained herein, the use of members of the same profile is made possible because in the cab assembly 60 of the invention the internal frame 10 performs no function in providing sealing surfaces for cladding panels described below. Therefore there is no need to provide customised profiles for the purpose of providing sealing surfaces as part of the internal frame. Furthermore the majority of the rigid members are straight as there is no requirement for them to follow closely the shapes or contours of the cladding panels.

Rigid members 11 and 12 respectively are right hand and left hand front uprights of the internal frame; and members 13 and 14 respectively are right and left hand rear uprights. These members define the vertically extending corner edges of an essentially cuboidal space defined by the internal frame 10.

In the embodiment shown the members 11, 12, 13 and 14 are curved and do not extend exclusively vertically. These features however are primarily concerned with the styling of the cab assembly. It is not therefore necessary for these members to have the same degree of curvature as those shown (or indeed any curvature at all), or to extend inclinedly upwardly. The precise shapes of many of the rigid members of the internal frame 10 indeed can be chosen by the vehicle designer to suit the aesthetics of the vehicle in which the cab assembly is to be installed.

A front lower crossmember 16 extends horizontally to interconnect the right and left front uprights 11, 12 at their lowermost ends.

A roof perimeter brace 17 interconnects the upper ends of the uprights 11, 12, 13 and 14. Roof perimeter brace 17 defines the sides and rear of the roof of the cab assembly and in the illustrated embodiment has curved corners, although this is a feature that need not necessarily be present in other cab assemblies in accordance with the invention.

The roof perimeter brace 17 is discontinuous in the region between the right hand and left hand uprights 11, 12. In this region the top ends of the uprights 11, 12 are interconnected by a front upper crossmember 27 that has a different profile than the rigid members described thus far. In some embodiments of the invention however the roof perimeter brace can be continuous and can have the same cross-section all the way round. In any event the purpose of the roof perimeter brace is to rigidify the upper part of the internal frame 10.

The lower ends of the right hand and left hand uprights 11, 12 are secured to respective right hand and left hand lower side members 18, 19 that extend rearwardly and assist to define the lower part of the internal frame 10. The side members 18, 19 in the preferred embodiment shown initially recess inwardly at an angle to the sides of the internal frame 10 before extending generally straight towards the rear of the cab assembly.

At their rear ends the side members 18, 19 are secured to the lower ends of respective right hand and left hand wheelarch braces 22, 23 that as shown from the side members extend initially upwardly before turning outwardly at right angles to intersect the lowermost ends of the right hand and left hand rear uprights 13, 14 respectively.

It will be apparent therefore that at its lower part the internal frame 10 is somewhat narrower in the side to side direction than the roof section. This is because the internal frame must accommodate the rear wheels of the tractor, that intrude somewhat into the space that would otherwise be available in a pure cuboid. The wheelarch braces 22, 23 are shaped accordingly.

A roof crossmember 24 extends from one lateral side of the roof perimeter brace 24 to the other part way between the front and the rear of the roof part of the internal frame 10 and is rigidly secured at either end. A series of in the embodiment shown four (although in other embodiments other numbers are possible) roof rear braces 26a, 26b, 26c, 26d extends rearwardly from the roof crossmember 24 to intersect the rearmost edge of the roof perimeter brace. The rear roof braces 26a-26d provide falling object protection for the underlying part of the cab assembly 60, which is the space occupied by the vehicle operator most of the time.

This arrangement provides for an extremely strong upper part of the internal frame, that provides good roll-over and falling object protection while providing in the internal frame an un-braced area between the roof crossmember 24 and the front upper crossmember 27. This un-braced area permits the inclusion of an openable sunroof 52 in a roof panel 43 described in more detail below. The sunroof as a result of the arrangement of the rigid members in the vicinity of the roof part of the internal frame 10 is capable of opening fully without any rigid members interrupting its opening space.

Rear and intermediate floor crossmembers 28 and 29 transversely interconnect the lower side members 18 and 19. The crossmembers 28, 29 perform a bracing function and also can be used to support a floor panel or other floor member described in more detail below. The crossmembers 28, 29 act as the mounting points for the operator's seat that subsequently is installed, during fitting out of the interior of the cab assembly 60. The crossmembers 28, 29 must provide a secure attachment as they perform an important function when a seat belt test is performed, or if an operator seat belt becomes used in an accident situation.

Protruding from front lower crossmember 16 is a steering assembly brace hoop 31. This is formed as a bar both ends of which are secured as shown to the forward face of crossmember 16. The brace hoop 31 protrudes initially forwardly and then bends through ninety degrees to extend upwardly, before bending again at ninety degrees to define a hoop-like shape. Brace hoop 31 is used for supporting and locating parts of the steering assembly and pedals of the tractor.

The internal frame 10 may in addition to the foregoing parts include fillets, such as those indicated by numerals 32 and 33, for strengthening the joints between the rigid members described; and a range of further, rigidly secured features such as footwell braces 34, 36. The fillets 32, 33 assist the cab assembly 60 to pass a roll-over protection test, part of which involves applying a pushing force at the rear of the assembly 60.

Protruding from the internal frame at various locations are various brackets the designs of which are not all the same but that for convenience are designated by numeral 37. Notwithstanding the variations in the bracket designs their purpose is to provide for attachment of a series of cladding panels described in more detail in relation to FIGS. 2 and 3 hereof. The basic function of each bracket is to provide an attachment point for part of a cladding panel, that is secured to the bracket on the exterior of the frame 10 by way of a fastening such as a screw or nut and bolt combination.

The accuracy of location of the cladding panels is achieved through a two-stage process of constructing the internal frame 10.

In this process the rigid members excluding the brackets 37 are welded together to form the basic shape of the internal frame 10. The thus-welded members are then allowed to cool and de-stress before welding attachment of the brackets 37, in positions to suit the selection of cladding panels to be attached, occurs. In this second stage the positions of the brackets are determined accurately by the welding tool which may be, for example, a robot arm.

The holes in the cladding panels in some cases are relatively small, in which case the tolerancing in the positioning of the panels is minimal; and in some cases, depending on the cladding panel design, the holes may be larger giving rise to a greater range of possible panel positions. These aspects of the design of the cab assembly 60 normally would be carefully controlled during development of the vehicle in which the assembly 60 would be installed.

As noted the metal of the internal frame is electrophoretically, preferably cataphoretically, coated but otherwise requires no further finishing once the rigid members are welded together.

Figure 2:
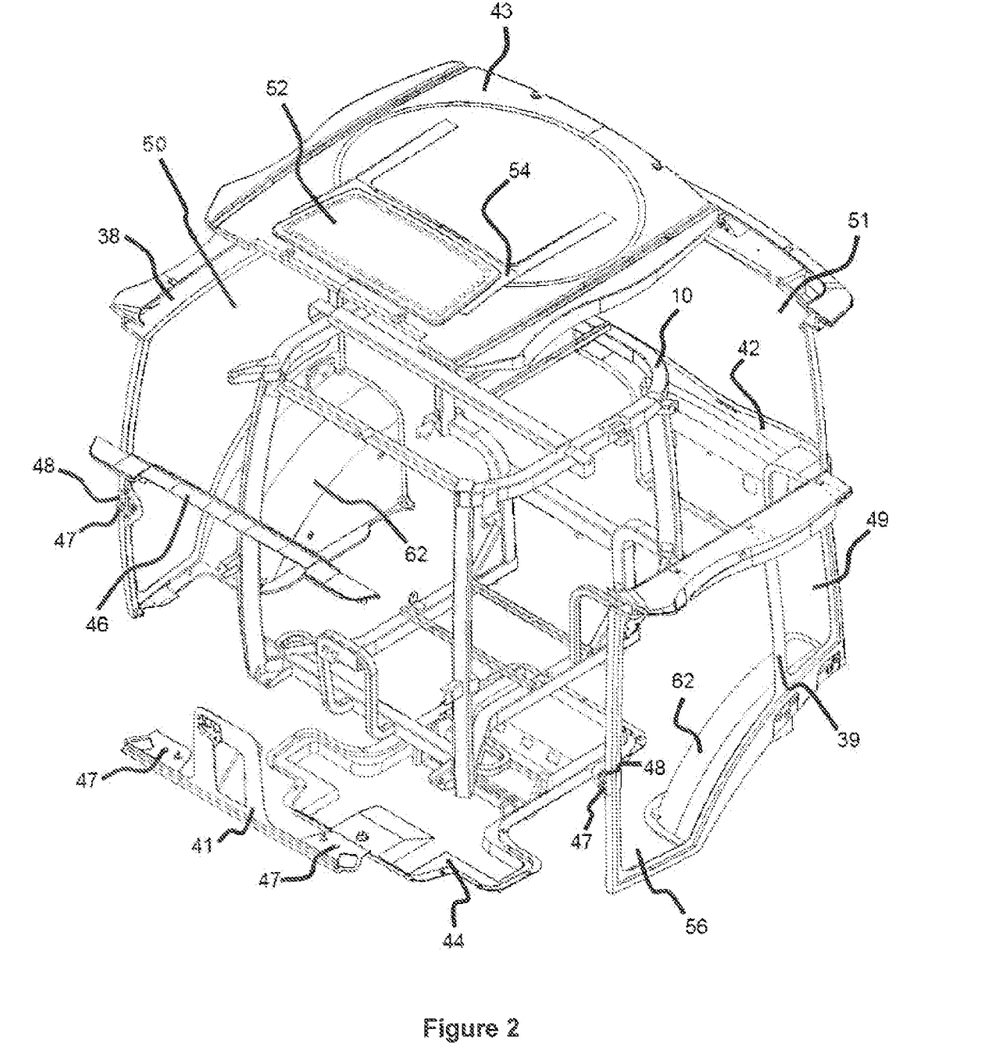
FIG. 2 shows the frame of FIG. 1 surrounded by a number of cladding panels, showing the positions in which the cladding panels are offered up to the frame during manufacture of the cab assembly.

FIG. 2 shows a series of the cladding panels being offered up to the frame 10 prior to being secured at the brackets 37. In a practical method of assembling the cab assembly of the invention the panels probably would not all be offered up simultaneously for fitting as illustrated, and instead would be presented and secured one by one, or perhaps (depending on the number of fitters available to assemble the assembly and the layout of any production line or assembly area available) two at a time.

The cladding panels visible in FIG. 2 are right hand and left hand side wall panels 38, 39; a front bulkhead panel 41; a rear wall panel 42; a roof panel 43; a bottom panel 44 and a windscreen top rail 46.

As explained these panels are secured to the various brackets 37 using appropriate fastenings and to this end are formed with screw holes such as those exemplified by numeral 47 in FIG. 2. The screw holes may be formed in the material of the cladding panels or in lugs 48 or other formations intended to act as anchor points on fixing of the cladding panels in place.

At least the side wall panels 38, 39, the rear wall panel 42 and the front bulkhead panel 41 between them are intended to enclose the internal frame 10 over at least part of the height of the latter, and from front to back. Where the internal frame is so enclosed it is obscured as described herein, giving rise to the advantages also described herein. In the embodiment shown the cladding panels illustrated in FIG. 2 enclose all the rigid members of the internal frame except parts of uprights 11 and 12. These latter are fully enclosed when a windscreen 64 is later added to the assembly 10.

In other embodiments of the invention different arrangements of cladding panels are possible. The cladding panels thus may for example enclose the internal frame over a greater proportion of its height than in the example shown. Moreover the cladding panels do not have to adopt the essentially cuboidal arrangement of the preferred embodiment; and indeed the vehicle designer has considerable latitude, for example by adjusting the numbers and locations of the brackets 37 and adjusting the numbers, shapes and sizes of the cladding panels, to vary the appearance of the cab assembly without necessarily altering the fundamental design of the internal frame. Among other things this provides the benefit for a vehicle manufacturer responsible for more than one vehicle brand of being able to use the same underlying structure (the internal frame 10) to support different external cab appearances that match the styles of different brands within the ranges offered.

This offers numerous advantages in terms of the economy of manufacture of the cab assembly. Equally, however, as explained herein the design of the internal frame may also be varied significantly within the scope of the invention.

Regardless of the exact designs adopted it will be apparent that as the panels are fixed at the brackets 37 they present mutually abutting panel edges.

Preferably the panels are made from one or more types of sheet moulded composite (SMC) the specifications of which are known in the automotive design art. Such composites can be moulded with very high precision. As a result the abutting edges of the cab assembly can be aligned very accurately. This makes sealing the edges a more reliable step than the sealing in the prior art of panel edges to members of the cab assembly frame.

As a result of the accuracy of alignment of the panel edges it is possible rapidly to seal them using preferably a bi-adhesive tape that can be quickly applied. One method of applying the bi-adhesive tape is to fix a first panel (say right hand side wall 38) via the screw holes 47, brackets 37 and appropriate screws or other fasteners; and then apply the tape along an edge such as the top edge.

This leaves one adhesive side of the adhesive tape exposed on the top edge. When subsequently (following similar fitting of the left hand side wall panel 39, rear wall panel 42 and windscreen top rail 46) the roof panel 43 is added, as long as it is accurately positioned on top of the internal frame 10 its periphery will align with and contact the exposed surface of the tape. When therefore the fastenings for the roof panel 43 are secured the periphery of the latter automatically and accurately becomes sealed to the edges at the tops of the upstanding panels by that stage already secured in place.

Similar sealing processes can take place with respect to other edges of the cladding panels. Consequently the steps of sealing the cab assembly are greatly superior to those of the prior art.

As an alternative to the bi-adhesive tape other sealing media may be used. Examples include liquid or paste-like compounds that may be dispensed into the gaps between panel edges using a dispenser such as a caulking gun.

As best illustrated in FIG. 2 several of the cladding panels include formed therein window apertures such as apertures 49, 50 and 51 visible in panels 38, 39 and 42.

As illustrated in FIG. 3 which shows the cab assembly 60 in completed form these apertures are filled by respective glazing panels such as panel 53 visible in FIG. 3 that preferably are made from a transparent polymer material or composite.

Such glazing panels may be formed with a comparable degree of tolerancing accuracy to the various cladding panels and therefore may be very precisely fitted into the apertures 49, 50 and 51. Sealing of the edges of the glazing panels to the apertures may be achieved in similar manner to the sealing of the cladding panel edges as described above; or alternatively a more conventional automotive windscreen construction can be adopted in which an elastomeric glazing seal is retained in grooves in the cladding panels and glued to the glazing panels about their peripheries.

Of course other patterns of the window apertures and the glazing panels may be provided in order to suit the design of the cab assembly 60. The glazing panels moreover may if desired be tinted or may include other visual features; they may include one or more electrical components such as demisting/defrosting heater elements, radio antennae and other elements that usefully can be added them or incorporated in their structures; and they may include hinges and latches permitting their opening and closing.

The front of the cab assembly 60 as shown in FIG. 3 is glazed from top to bottom and side to side by a single transparent windscreen panel 64. This is similar to the glazing panel 53 and is secured similarly about its periphery to the internal frame members 11, 12, 16 and 27. The windscreen panel 64 may if desired before installation be pre-fitted with for example windscreen wipers and their associated mechanisms plus for example direction indicator and running lights. The windscreen panel also may include electrical sub-systems such as demister/defroster heaters and/or antennae as described above, together with one or more gas struts, hinges and latches permitting tilting of an openable section to an open position from the closed position shown in FIG. 3. The struts, hinges and latches may be secured to the internal frame 10 by way of brackets 37.

The windscreen panel 64 may be made from the same material as the other glazing panels; or it may be of a different material. In one option the glazing panels at the sides of the tractor, which panels tend to be openable, may be made from a polymer in order to confer lightness; and the front and rear windows may be formed from glass or a glass-polymer laminate.

As is visible in FIG. 3 windscreen panel 64 includes formed therein at its bottom edge a cut-out 66. This follows the shape of the steering assembly brace hoop 31 and thereby allows a steering column to protrude from the inside of the cab towards front steerable wheels of the vehicle.

A slightly different type of glazing panel 52 is present in roof panel 43, in the form of a slideable and tiltable sunroof 52. This may be retained moveably captive on a system of rails that allow it to move forwardly and rearwardly as desired in order to open and close a sunroof aperture 54 a clear opening for which is left by the arrangement of the frame elements 24, 26 described above.

Preferably the roof panel 43 is formed to include the parts permitting operation of the sunroof before the roof panel 43 is fitted onto the tops of the upstanding walls defined by the cladding members 38, 39, 42 and 46.

A particular feature of the left hand side wall panel 39 is an openable door aperture 56 in which on assembly of the cab assembly 60 is fitted a door panel 57 that is moveably securable in the openable aperture 56 such as to permit its conversion between closed and open configurations. The door panel 57 permits operator access into and out of the cab assembly 60 when the latter is assembled into a vehicle.

To this end the door panel 57 is hingedly secured by way of top and bottom hinges, the lower 58 of which is visible in FIG. 3, to the internal frame 10. In hinge 58 a hinge pin 59 secured to door panel 57 is rotatably received in a hasp 61 that is bolted by way of bolts extending through the material of left hand side wall panel 39 to hinge bracket 37' that protrudes outwardly from left hand lower side member 19. However other ways of arranging hinging of the door panel 57 are possible within the scope of the invention.

It is conventional in some agricultural tractors to provide an openable door on only one side of the cab assembly, in order to minimise the risk of accidents occurring when operators are entering and leaving the cab. For this reason no direct counterpart of the door panel 57 is present in right hand side wall cladding panel 38, and instead this panel is glazed from front to back and top to bottom by a glazing panel that may include openable window portions but is in use essentially fixed in place, preferably in like manner to the fixing of glazing panel 53.

However when the cab assembly 60 is designed for use in a vehicle other than a tractor one or more further openable door panels such as panel 57 may be provided.

Panel 57 also may be glazed and may include one or more openable windows.

As best seen in FIG. 2 each of the side wall panels 38, 39 includes formed therein a respective wheelarch 62. This optional feature may beneficially be formed in each panel 38, 39 as the panels are manufactured and thereby provide on completion of the cab assembly 60 conveniently located left and right mudguards for the rear wheels of the tractor. Immediately in front of the wheelarch on each side of the cab assembly the panels 38, 39 are shaped to accommodate a footwell 63 that is defined by a floor member that while not visible in the drawings is positioned parallel to and above bottom member 44, overlying and supported on the frame members 28, 29.

The footwells respectively are occupied by the footstep braces 34 and 36 of the internal frame 10, thereby providing for a strong structure underlying the floor member described above.

The floor member as noted extends essentially parallel to and overlies the bottom member 44 and thereby defines with bottom member a void inside which one or more sub-systems of the vehicle may be secured. The preferred sub-system in the case of an agricultural tractor is an air conditioner the fan, chiller and ducts of which may readily and neatly be accommodated in this void. During manufacture of the cab assembly 60 the air conditioner including air conditioning gas after installation in the void may be connected to a test jig or other testing apparatus and provided with electrical power. It thus advantageously is possible to check, before final assembly of the vehicle, that the air conditioner is working correctly.

Other sub-systems may of course be substituted for the air conditioner depending on the expected usage of the vehicle. Regardless of the exact sub-system type installed however it is desirable for the floor member while being sufficiently rigid as to support the people and objects likely to be carried inside the cab also to include an openable hatch or removable panel permitting maintenance access to the sub-system.

Figure 4:
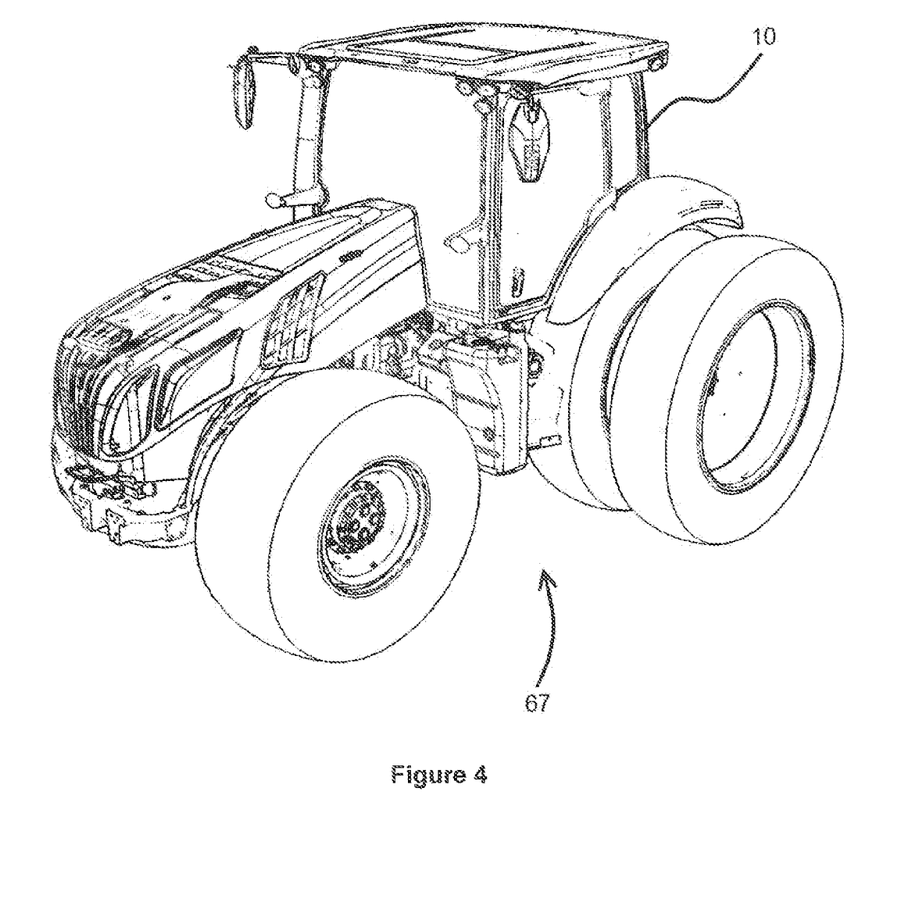
FIG. 4 shows a vehicle, in the form of a tractor, including a cab assembly such as that of FIG. 3.

In addition to the features described above the invention resides in a method of manufacturing a cab sub-assembly as described herein; and to a vehicle 67 including such a cab assembly 60. Such a vehicle 67 is illustrated in FIG. 4.

The assembly 60 gives rise to numerous advantages, as set out above, compared with the prior art. It is expected to make a significant contribution both to the economics of cab construction and also the flexibility of vehicle designers to alter the appearances of vehicles while the underlying engineering remains unchanged.

The listing or discussion of an apparently prior-published document in this specification should not necessarily be taken as an acknowledgement that the document is part of the state of the art or is common general knowledge.

The invention claimed is:

1. A vehicle cab assembly comprising:
   an internal frame including a plurality of rigid members that are secured rigidly to each other; and
   a plurality of interconnected cladding panels that obscure the internal frame and enclose the internal frame in at least one plane, the plurality of cladding panels being supported on an exterior of the internal frame and defining a plurality of mutually abutting panel edges, wherein adjacent cladding panels of the plurality of cladding panels are interconnected along their respective mutually abutting panel edges to define a plurality of weather-proof joints of the vehicle cab assembly, wherein at least one cladding panel of the plurality of cladding panels includes formed therein an openable aperture;
   a door panel that is moveably securable in the openable aperture such as to permit conversion between closed and open configurations; and
   one or more hinges moveably supporting the door panel relative to the openable aperture, wherein the one or more hinges extend through an aperture in the at least one cladding panel and are secured to the internal frame.

2. The vehicle cab assembly according to claim 1, wherein at least a majority of the plurality of rigid members are metal tubular members each of the same cross-section.

3. The vehicle cab assembly according to claim 2, wherein rigid members of the plurality of rigid members are welded one to another, are unpainted, and are electrophoretically coated.

4. The vehicle cab assembly according to claim 1, wherein each cladding panel of the plurality of cladding panels is secured to the internal frame using one or more fixing members.

5. The vehicle cab assembly according to claim 1, wherein mutually abutting panel edges of adjacent cladding panels are interconnected by a sealing bi-adhesive tape.

6. The vehicle cab assembly according to claim 1, wherein the plurality of cladding panels define at least four upstanding side walls of the cab, a roof panel, and a bottom panel.

7. The vehicle cab assembly according to claim 6, wherein the at least four upstanding side walls are interconnected so as to enclose the internal frame in a region between uppermost and lowermost parts of the at least four upstanding side walls.

8. The vehicle cab assembly according to claim 6, wherein the at least four upstanding side walls include a front wall, a rear wall, opposite the front wall, and respective side walls disposed on opposite sides of the vehicle cab assembly interconnecting the front and rear walls.

9. The vehicle cab assembly according to claim 1, wherein at least one of the plurality of cladding panels includes formed therein an aperture that is closed by a transparent glazing panel that is secured at edges of the aperture to the at least one cladding panel.

10. The vehicle cab assembly according to claim 8, wherein the respective side walls each have formed therein a wheelarch.

11. The vehicle cab assembly according to claim 6, further comprising a void defined above the bottom panel.

12. The vehicle cab assembly according to claim 11, including one or more vehicle subsystems in the void.

13. The vehicle cab assembly according to claim 1, wherein each cladding panel of the plurality of cladding panels is made from or includes a sheet-moulded (SMC) composite material.

14. A method of assembling the vehicle cab assembly according to claim 1, comprising:
    forming the internal frame from metal;
    securing the plurality of cladding panels to the internal frame using respective fixings interconnecting the plurality of cladding panels and the internal frame;
    sealing using a sealing medium the plurality of mutually abutting panel edges; and
    using one or more hinges each extending respectively through an aperture formed in a respective cladding panel of the plurality of cladding panels to secure at least one moveable door panel to the internal frame so as to be moveable between closed and open configurations.

15. The method according to claim 14, including securing at least one transparent glazing panel in an aperture formed in at least one cladding panel of the plurality of cladding panels using a sealing adhesive compound to bond edges of the at least one transparent glazing panel to edges of the aperture.

16. A vehicle including the vehicle cab assembly according to claim 1.

17. The vehicle according to claim 16, wherein the internal frame is a roll-over protection structure (ROPS) and/or a falling object protection structure (FOPS) for an interior of the vehicle cab assembly.

* * * * *